March 13, 1962 J. J. KERLEY, JR 3,025,031
VIBRATION ISOLATOR ARRANGEMENT TO REDUCE
STRESS CONCENTRATION OF CABLE
Filed Jan. 21, 1960 2 Sheets-Sheet 1

FIG. 3 FIG. 4

INVENTOR
James J. Kerley, Jr.

BY *Walter G. Finch*
ATTORNEY

March 13, 1962   J. J. KERLEY, JR   3,025,031
VIBRATION ISOLATOR ARRANGEMENT TO REDUCE
STRESS CONCENTRATION OF CABLE
Filed Jan. 21, 1960   2 Sheets-Sheet 2
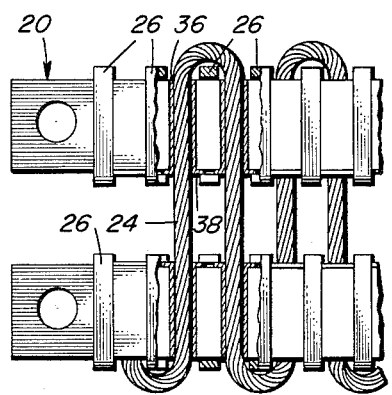
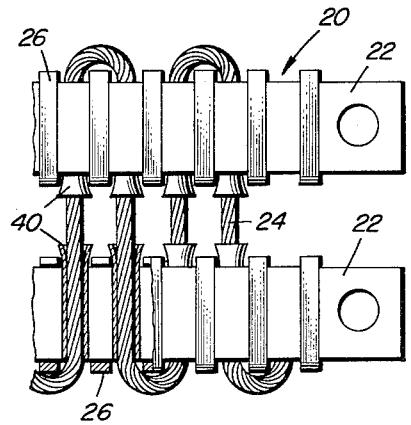
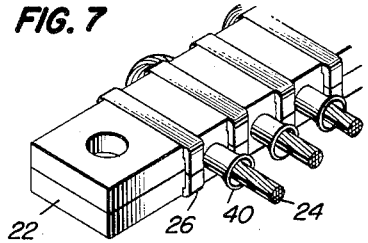
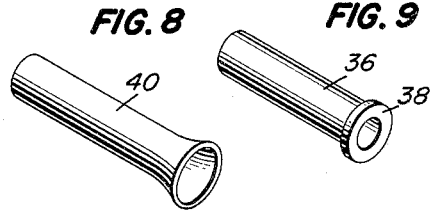
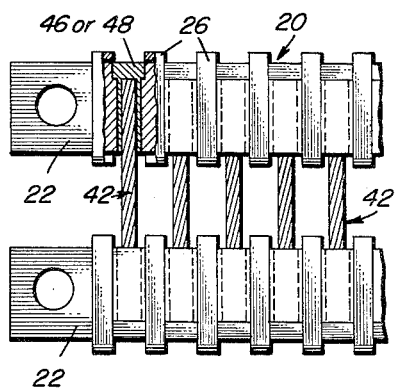
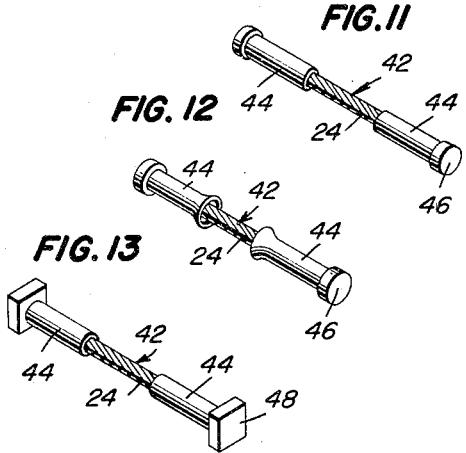
INVENTOR
James J. Kerley, Jr.
BY *Walter G. Finch*
ATTORNEY

United States Patent Office 3,025,031
Patented Mar. 13, 1962

3,025,031
VIBRATION ISOLATOR ARRANGEMENT TO RE-
DUCE STRESS CONCENTRATION OF CABLE
James J. Kerley, Jr., Cheverly, Md., assignor to Kerley
Engineering, Inc., Cheverly, Md., a corporation of
Maryland
Filed Jan. 21, 1960, Ser. No. 3,890
5 Claims. (Cl. 248—358)

This invention relates generally to shock and vibration type supports, and more particularly it pertains to cable type shock and vibration isolator amounts.

In co-pending U.S. patent application Serial Numbers 744,787; 803,429, now abandoned; and 809,968, filed by applicant on June 26, 1958, April 1, 1959, April 30, 1959, and entitled "Vibration Isolator Mount," "Vibration Isolation Couplings," and "Mechanical Impulse Filter Type Shock Mount," respectively, there are described novel arrangements for shock and vibration isolator devices.

Resilient cable constitutes an important part in common in these shock and vibration type isolator devices or mounts. Because of the unique qualities of multi-stranded cable, the mounts fabricated according to the above referenced patent applications are employed under exceptional vibration and shock amplitudes which approach destructive amounts. The present invention concerns improvements which have been designed to extend the useful life of the multi-stranded cable used in these mounts.

It is, therefore, an object of this invention to provide a comb strip for shock and vibration isolators having stress distributing and relieving cable securement.

Another object of this invention is to provide a cable stress absorbing structure as an integral part of a shock and vibration isolator comb strip.

Another object of this invention is to provide a combination vibration stress distributing and shock stress absorbing comb strip for the cables of a vibration and shock isolator mount system.

Still another object of this invention is to provide malleable material inserts for comb strips of shock and vibration isolators to distribute moderate cable stress and absorb extreme cable distortion.

And yet another object of this invention is to provide malleable terminations for the cables of shock and vibration isolators.

These and other objects and attendant advantages of this invention will become more readily apparent and understood from the accompanying specification and drawings in which:

FIG. 3 is a detail plan view, partly broken away, of a portion of a shock and vibration isolator illustrating another embodiment of the invention;

FIG. 4 is a detail plan view, partly broken away, of a portion of a shock and vibration isolator, still another embodiment of the invention;

FIG. 5 is a detail plan view, partly broken away and partly in section, of a portion of an improved shock and vibration isolator, illustrating the use of stress relief cable fairways or bushings;

FIG. 6 is a detail plan view, partly broken away and partly in section of a portion of an improved shock and vibration isolator illustrating the use of cable bearings or bushings of a flared type;

FIG. 7 is a perspective drawing of a portion of a shock and vibration isolator illustrating the retention of cable protective bushings;

FIG. 8 is a perspective drawing of a flared bushing;

FIG. 9 is a perspective drawing of a shouldered bushing;

FIG. 10 is a detail plan view, partly broken away and partly in section of a cable type shock and vibration isolator employing pre-assembled individual cable elements;

FIG. 11 is a perspective drawing of a cable element;

FIG. 12 is a perspective drawing of a flared type cable element; and

FIG. 13 is a perspective drawing illustrating the use of squared end bushings for a prestressed shock and vibration isolator.

Figure 1:
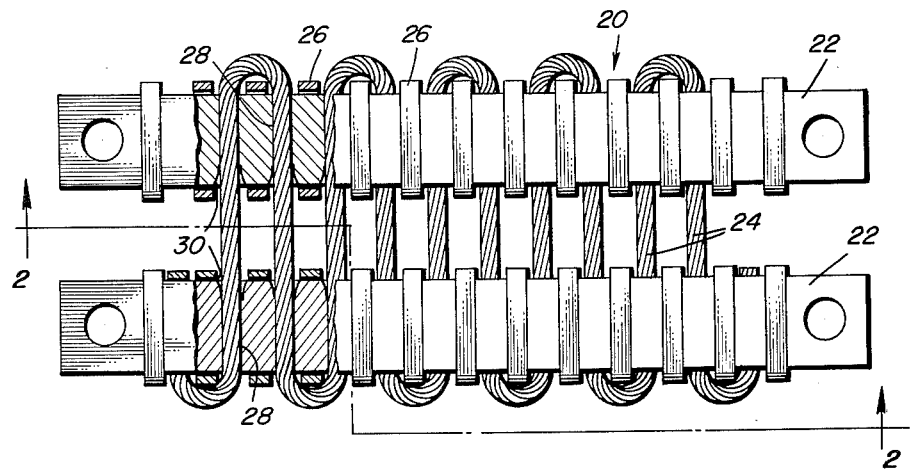
FIG. 1 is a plan view, partially in section of a stress relieved shock and vibration isolator incorporating features of this invention.
Figure 2:
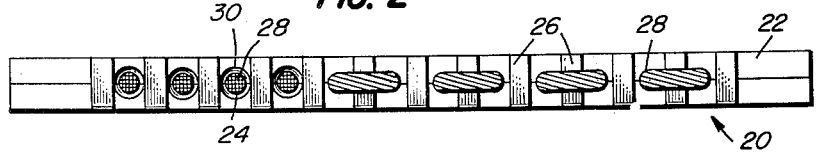
FIG. 2 is a view taken along line 2—2 of FIG. 1.
Figure 2:
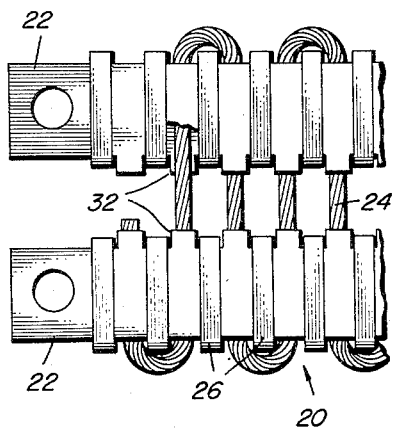
Figure 2:
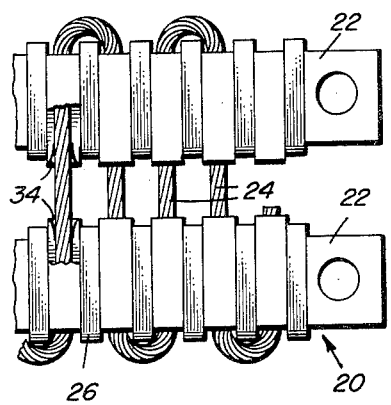

Referring now to FIGS. 1 and 2 of the drawings, there is illustrated a shock and vibration type isolator indicated generally by reference numeral 20 which incorporates features of this invention. Isolator 20 consists of two spaced comb strips 22 joined by a plurality of passes of multi-strand resilient cable 24.

Each comb strip 22 may be in one piece or of two piece sandwich construction held together by wrap-around clips 26 as shown in FIGS. 1 and 2. The comb strips 22 are milled or drilled so as to provide apertures 28 for the cable 24.

The opposing ends of the apertures 28 of the pairs of comb strips 22 are provided with a smooth bell-mouth 30 so that stress concentration at the side of the cable 24 where it emerges from the comb strip 22 can be relieved. Without such relief of stress concentration for the part, this place is always the maximum stress and wear point in an isolation system of the cable type causing the strands of the cable 24 to break, one at a time.

Another type of relief at the emerging point of the cable 24 from the isolator 20, which is especially effective under great cable deformation, such as under shock and vibration of the isolator 20, is illustrated in FIG. 3.

An extended protrusion 32 is formed from the material of comb strip 22 so as to surround the emerging cable 24 for a short distance with a shank-like sheath. No particular protection to the cable 24 is thus offered under moderate repetitive motion. However, a high amplitude excursion of the cable 24 bends this protrusion 32 slightly within its limit of elasticity and absorbs energy to extend the fatigue life of the cable 24.

FIG. 4 illustrates a combination of the methods of shank and bell-mouth stress relief to handle both low amplitude vibration and high shock excursions of the cable 24. A re-entrant boss 34 is formed from the material of comb strips 22 in like manner to that for the protrusions 32 previously mentioned.

The choice of material, the degree of bell-mouthing or re-entrant, and the diameter of the protrusion 32 or boss 34 all with relation to the diameter of the cable 24 provide any degree of stress and shock relief as will occur to those skilled in the art in the light of these teachings.

In cases where the material of the comb strips 22 is not suited elastically to perform the desired function, a bushing 36, shown in FIG. 9, of the chosen malleable material may be used as shown in FIG. 5. To captivate the bushing 36, it may be formed with a shouldered head 38 which is held effectively by the adjacent clips 26 in connection with FIGS. 5 and 6 previously described.

A bell-mouthed bushing 40 is readily fabricated as shown in FIG. 8, and it may be captivated by force fit in a one piece comb strip 22 or by the tension of the wrap-around clips 26 in the case of a two piece comb strip assembly as shown in FIGS. 6 and 7.

Special types of cable fittings 42 combining the functions of stress relief and cable termination are shown in FIGS. 10, 11, 12, and 13. A malleable sleeve 44 is swaged to an inserted length of resilient cable 24 and it is provided with an upset round or square head 46 or 48, respectively. The length of the malleable sleeve 44 may be chosen to protrude from the comb strip 22 as desired and also may readily be provided with the stress relief bell-mouth 30. The cable fittings 42 may be cast into a one piece comb strip 22 or retained in a two piece comb strip assembly by the clips 26 as shown in FIG. 10.

Cable fittings 42 provided with malleable sleeves 44 having the square heads 48 are especially useful where the cable 24 is to be prestressed by twisting to adjust its resiliency. In such cases the square head 48 prevents untwisting of the cable fitting 42 within the comb strips 22 while the malleable sleeve 44 provides stress relief for the cable 24.

Obviously many modifications and variations of the present invention are possible in light of the above teachings. It is, therefore, to be understood that within the scope of the appended claims the invention may be practiced otherwise than as specifically described.

What is claimed is:

1. A shock and vibration isolator comprising a pair of substantially coplanar parallel spaced members, each member comprising means for rigidly attaching the same to another structure, a multiplicity of parallel bore means in each member, each bore means in one member being alignable with a corresponding bore means in the other member, resilient cable means connecting the members and forming multiple passes between corresponding bores therein, means positioning the cable passes longitudinally in the bores, and malleable protrusion means extending from each member toward the other encircling each cable pass at each end thereof, whereby said cable passes are yieldably supported under shock at each end thereof.

2. The structure defined in claim 1 wherein malleable sleeve means are provided surrounding each cable pass in each bore means and protruding toward the opposite member to provide the said protrusion means.

3. The structure defined in claim 2 wherein the sleeve means is provided with a positioning enlargement at its end opposite the protrusion means.

4. The structure defined in claim 3 wherein the cable means is terminated within each sleeve means.

5. The structure defined in claim 4 wherein the positioning enlargement of the sleeve means is of polygonal section and further including means carried by the members peripherally engaging said section to fix the orientation of the sleeve means in the bore means.

References Cited in the file of this patent

UNITED STATES PATENTS

| | | |
|---|---|---|
| 1,898,677 | Malone | Feb. 21, 1933 |
| 2,202,707 | Matthes | May 28, 1940 |
| 2,873,109 | Hartenstein | Feb. 10, 1959 |

FOREIGN PATENTS

| | | |
|---|---|---|
| 782,902 | France | Mar. 25, 1935 |